(12) United States Patent
Kim et al.

(10) Patent No.: US 12,206,775 B2
(45) Date of Patent: Jan. 21, 2025

(54) APPARATUS FOR GENERATING NON-COPYABLE DIGITAL VALUE, AND METHOD THEREFOR

(71) Applicant: LG ELECTRONICS INC., Seoul (KR)

(72) Inventors: Kwang Su Kim, Seoul (KR); Gye Su Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 17/778,384

(22) PCT Filed: Nov. 20, 2019

(86) PCT No.: PCT/KR2019/015956
§ 371 (c)(1),
(2) Date: May 19, 2022

(87) PCT Pub. No.: WO2021/100903
PCT Pub. Date: May 27, 2021

(65) Prior Publication Data
US 2022/0400003 A1 Dec. 15, 2022

(51) Int. Cl.
*H04L 9/08* (2006.01)
*G06F 7/58* (2006.01)
(Continued)

(52) U.S. Cl.
CPC .............. *H04L 9/0866* (2013.01); *G06F 7/58* (2013.01); *G06F 21/73* (2013.01); *G06F 21/75* (2013.01);
(Continued)

(58) Field of Classification Search
CPC ... H04L 9/0866; H04L 9/0869; H04L 9/3278; G06F 7/58; G06F 21/73; G06F 21/75; G06F 7/588; G16Y 30/10
See application file for complete search history.

(56) References Cited

U.S. PATENT DOCUMENTS

| | | | |
|---|---|---|---|
| 6,046,616 A * | 4/2000 | Chan | H03K 3/84 327/175 |
| 2016/0110166 A1* | 4/2016 | Moschopoulos | G06F 7/588 708/250 |

(Continued)

FOREIGN PATENT DOCUMENTS

KR 1020180128373 12/2018

OTHER PUBLICATIONS

PCT International Application No. PCT/KR2019/015956, International Search Report dated Aug. 14, 2020, 3 pages.

*Primary Examiner* — Cheng-Feng Huang
(74) *Attorney, Agent, or Firm* — LEE, HONG, DEGERMAN, KANG & WAIMEY (57) ABSTRACT

An apparatus for generating a digital value, and a method therefor are proposed. The apparatus for generating the digital value includes: a data generation part configured to randomly generate a first digital value; a data preservation part configured to store the first digital value; and a data concealment part configured to generate a final digital value by synthesizing the first digital value and a second digital value outputted from a volatile element. Accordingly, there is an effect that randomness of the final digital value is confirmable, and the final digital value is not leaked to outside.

9 Claims, 7 Drawing Sheets

(51) Int. Cl.
    *G06F 21/73*    (2013.01)
    *G06F 21/75*    (2013.01)
    *G16Y 30/10*    (2020.01)
    *H04L 9/32*    (2006.01)

(52) U.S. Cl.
    CPC ............ *H04L 9/0869* (2013.01); *G06F 7/588* (2013.01); *G16Y 30/10* (2020.01); *H04L 9/3278* (2013.01)

(56) References Cited

U.S. PATENT DOCUMENTS

| | | |
|---|---|---|
| 2017/0149572 A1 | 5/2017 | Wallrabenstein |
| 2017/0180140 A1 | 6/2017 | Mai et al. |
| 2018/0018673 A1 | 1/2018 | Muchsel et al. |
| 2018/0039485 A1* | 2/2018 | Wilber .................... G06F 7/588 |
| 2018/0212786 A1 | 7/2018 | Kamiyama et al. |
| 2018/0375650 A1* | 12/2018 | Legre ..................... H04L 9/0855 |
| 2020/0342135 A1* | 10/2020 | Kulkarni ............. G06F 11/3688 |
| 2021/0119791 A1* | 4/2021 | Kim ........................ G06F 21/64 |
| 2021/0281408 A1* | 9/2021 | Liu ........................ H04L 9/3297 |

\* cited by examiner

APPARATUS FOR GENERATING NON-COPYABLE DIGITAL VALUE, AND METHOD THEREFOR

CROSS-REFERENCE TO RELATED APPLICATIONS

This application is the National Stage filing under 35 U.S.C. 371 of International Application No. PCT/KR2019/015956, filed on Nov. 20, 2019, the contents of which are all incorporated by reference herein in their entirety.

TECHNICAL FIELD

The present disclosure relates to an apparatus for generating a non-copyable digital value, and a method therefor and, more particularly, to security of semiconductor chips.

BACKGROUND ART

Recently, due to the development of the Internet of Things (IoT), various devices providing convenience to human life, such as smart home appliances, connected cars, and electronic tags (RFID), are emerging. However, hacking incidents on these IoT devices are frequently reported, whereby such hacking may directly and adversely affect the bodies and property of users, and thus safe security measures for semiconductor chips are required.

In order to solve this problem, technologies for generating security information inside a chip are being studied, and one of these technologies is a physical unclonable function (PUF) technology. The PUF provides a unique digital value for each chip, and this digital value should be random between chips, should be preserved without changing with time or an external stimulus such as temperature or voltage, and should not be exposed during chip production and use.

However, in a case of the PUF using the existing process deviations, in order to confirm randomness, a result of the randomness should be checked by proceeding with a process, but since external exposure should not be allowed in accordance with the requirements of PUF, there is no way to confirm the result of the randomness from outside. Even when a method to check externally for testing is created and used for checking and then the external checking method is removed in an actual mass production process, it cannot be said that the randomness of the actual process has the same randomness as that of the test process due to the characteristics of using process variations.

In addition, in the PUF, a method of confirming data preservation with time or an external stimulus such as temperature or voltage is very difficult to perform. Additionally, in a case of preserving data by using a non-volatile element in order to confirm the data preservation, there is a possibility of exposure due to chip decapsulation (De-Cap), and thus there is a problem with vulnerability to replication.

DISCLOSURE

Technical Problem

An objective of the present disclosure for solving the problem is to provide an apparatus for generating a digital value capable of confirming randomness, and a method therefor. In addition, another objective of the present disclosure for solving the problem is to provide an apparatus for generating a digital value, and a method therefor, the digital value having data preservation in which the digital value does not change even when an external stimulus such as temperature or voltage is applied or time passes. In addition, yet another objective of the present disclosure for solving the problem is to provide an apparatus for generating a non-copyable digital value, and a method therefor, the digital key having a final digital key unable to be leaked to outside even when digital value extraction is attempted through chip decapsulation (De-Cap), etc.

Technical Solution

An apparatus for generating a non-copyable digital value according to an exemplary embodiment of the present disclosure in order to solve the above problems includes: a data generation part configured to randomly generate a first digital value; a data preservation part configured to store the first digital value; and a data concealment part configured to generate a final digital value by synthesizing the first digital value and a second digital value outputted from a volatile element.

The data generation part may include: a random value generator configured to randomly generate a first random value; and a synthesizer configured to generate the first digital value by synthesizing the first random value and a second random value randomly generated and input from outside, thereby being able to confirm data randomness.

An apparatus for generating a non-copyable digital value according to the exemplary embodiment of the present disclosure in order to solve the above problems includes: a data generation part comprising a random value generator configured to randomly generate a first random value, and a synthesizer configured to generate a first digital value by synthesizing the first random value and a second random value randomly generated and input from outside; and a data preservation part configured to store the first digital value.

The random value generator may include at least one of a physical unclonable function (PUF) and a true random generator, and the data preservation part may include a non-volatile element configured to store the first digital value.

The second digital value that is output from the volatile element is configured to output the same value.

In addition, the data concealment part may include a synthesizer configured to generate the final digital value by synthesizing the first digital value and the second digital value, and the synthesizer may include an XOR logic circuit.

A method for generating a non-copyable digital value according to the exemplary embodiment of the present disclosure in order to solve the above problems generates a first digital value randomly, stores the first digital value, and generates a final digital value by synthesizing the first digital value and a second digital value outputted from a volatile element.

The generating of the first digital value may include: generating a first random value randomly; and generating the first digital value by synthesizing the first random value and a second random value that is random and input from outside.

A method for generating a non-copyable digital value according to the exemplary embodiment of the present disclosure in order to solve the above problems generates a first random value randomly, generates a first digital value by synthesizing the first random value and a second random value that is random and input from outside, stores the first digital value, and outputs the first digital value as a final digital value.

The storing of the first digital value may store the first digital value in a non-volatile memory, thereby ensuring data preservation.

Advantageous Effects

As described above, in the apparatus for generating the digital value, and the method therefor according to the present disclosure, the randomness of the final digital value is confirmable and the final digital value is non-copyable. In addition, the apparatus and the method therefor have excellent data preservation in that the digital value does not change even when an external stimulus is applied or time passes. In addition, there is an effect that even when digital value extraction is attempted through the chip decapsulation (De-Cap) and the like, the final digital value is not leaked to the outside.

MODE FOR INVENTION

Hereinafter, specific exemplary embodiments of the present disclosure will be described with reference to the drawings.

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

An apparatus for generating a digital value, and a method therefor according to the present disclosure are configured to generate a digital value, that is, security information inside a chip, and are applicable to all semiconductor chips, IC chips, digital chips, and the like to which security is applied.

An apparatus for generating a digital value, and a method therefor according to a first exemplary embodiment of the present disclosure will be described with reference to FIGS. 1 to 3.

Figure 1:
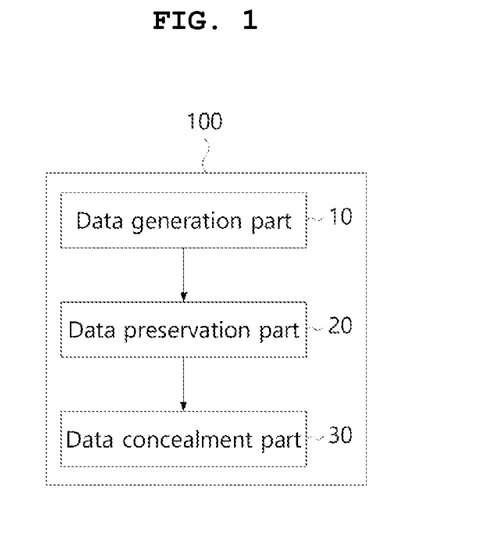
FIG. 1 is a schematic diagram illustrating an apparatus for generating a digital value according to a first exemplary embodiment of the present disclosure.
Figure 2:
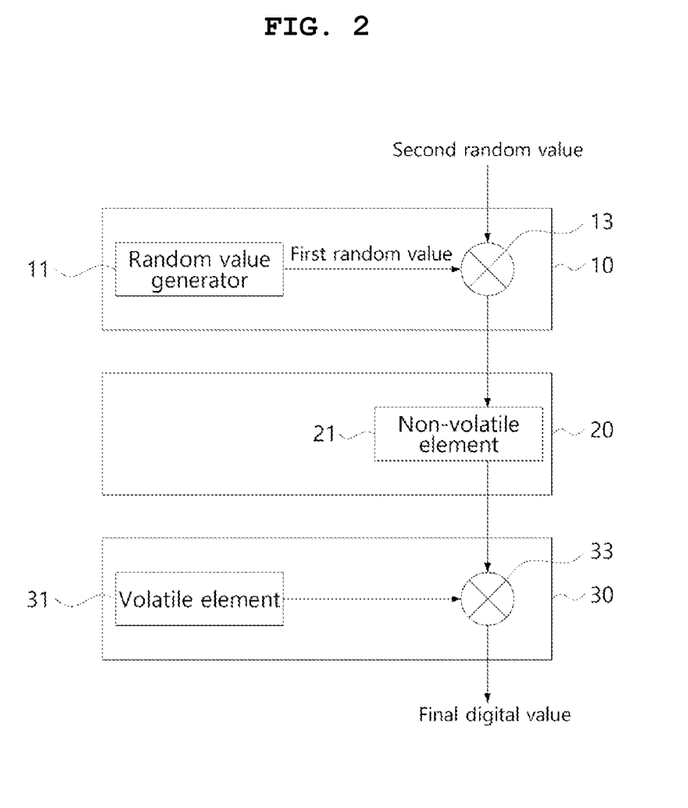
FIG. 2 is a detailed view illustrating the apparatus for generating the digital value according to the first exemplary embodiment of the present disclosure.

FIG. 1 is a schematic diagram illustrating the apparatus for generating the digital value according to the first exemplary embodiment of the present disclosure, and FIG. 2 is a detailed view illustrating the apparatus for generating the digital value according to the first exemplary embodiment of the present disclosure. Referring to FIG. 1, the apparatus for generating the digital value according to the present exemplary embodiment includes a data generation part 10, a data preservation part 20, and a data concealment part 30.

The data generation part 10 is configured to generate a random first digital value in response to an applied signal, and is a means for ensuring randomness of data.

Referring to FIG. 2, the data generation part 10 includes a random value generator 11 and a synthesizer 13.

The random value generator 11 is configured to randomly generate a first random value in response to the applied signal, and may be implemented by at least one of a physical unclonable function (PUF) and a true random generator. The true random generator may include any one of a hardware random number generator (HRNG), a true random number generator (TRNG), and a software random number generator. In the present exemplary embodiment, an example in which the random value generator 11 is implemented by the PUF will be described.

The first random value randomly generated by the random value generator 11 is generated by process variations in a semiconductor process, the process variations occurring in a process of producing at least one semiconductor element implementing the random value generator 11. For example, in a case of a transistor, a parameter such as an effective gate length, a doping concentration-related index, an oxide thickness-related index, a threshold voltage, or the like may be a cause of process variations. Since such process variations are due to a natural phenomenon, the random value generator 11 according to the present disclosure generates the first random value, which is randomly determined, by using the process variations of the semiconductor process. The random value generator 11 may include various digital elements such as a transistor, an inverter, a differential amplifier, or a latch. Since the output of the internal random value generator 11 is not exposed to outside and is random, the output is not leaked to the outside, whereby security is enabled.

The synthesizer 13 outputs a first digital value by synthesizing a second random value randomly generated and input from outside and a first random value generated by the internal random value generator 11. The synthesizer 13 may include an operator that performs an operation such as an exclusive-or (XOR) operation. The second random value is a value generated externally and input to the data generation part 10, and may be generated by external equipment or an external device. In the synthesizer 13, a synthesizer 13 that does not degrade the random characteristics of the second random value input from the outside is used.

In addition, in the internal random value generator 11, a digital value generator that does not degrade the random characteristics of the second random value input from the outside is used.

As described above, in the present disclosure, a random value is input from the outside to confirm randomness, a random value is also generated internally so that a digital value is not exposed during a process of chip production, and then both of the random values are synthesized. In this way, while taking the randomness of external equipment, the digital value may be prevented from leaking to the outside by making the digital value unknown to the external equipment. In addition, the randomness of a final digital value may be confirmable and the final digital value is non-copyable.

The data preservation part 20 is configured to store a first digital value outputted from the data generation part 10, and is a means for ensuring data preservation. The data preservation part 20 includes a non-volatile element 21 for storing the first digital value.

The data preservation part 20 may store the first digital value only once or may store the first digital value several times according to the characteristics of the non-volatile element 21. The number of times that data is stored may be set differently according to the characteristics and designs of the non-volatile element 21. The non-volatile element 21 may be implemented by at least any one of a read only memory (ROM), a programmable read only memory (PROM), an electrically programmable read only memory (EPROM), an electrically erasable programmable read only memory (EEPROM), and a flash memory.

The non-volatile element 21 maintains the first digital value stored therein even when an external stimulus such as temperature or voltage is applied or time passes. In this way, data preservation may be ensured. The first digital value stored in the non-volatile element 21 of the data preservation part 20 is a unique ID of a corresponding chip, that is, an identification key and a unique value corresponding to the identification value.

The data concealment part 30 receives the first digital value outputted from the data preservation part 20, synthesizes the first digital value and a second digital value outputted from the internal volatile element 31, and outputs a final digital value. The data concealment part 30 includes a volatile element 31. The second digital value outputted from the volatile element 31 may be input from the outside, or may be generated in an internal chip by itself, or may be input by software. The volatile element 31 uses an element that always maintains a predetermined value when the digital values are synthesized. The volatile element 31 may include a RAM type, for example, a dynamic random access memory (DRAM), or a static random access memory (SRAM), or the like.

The data concealment part 30 includes a synthesizer 33 for synthesizing a first digital value and a second digital value. The synthesizer 33 may include an operator that performs an operation such as an exclusive-or (XOR) operation. The synthesizer 33 uses a synthesizer 13 that does not degrade the random characteristics of the first digital value and the second digital value.

Since the data concealment part 30 synthesizes data through the volatile element 31, only the first digital value of the data preservation part 20 using the non-volatile element 21 is exposed even by chip decapsulation (De-Cap), whereby the final digital value is not exposed. The final digital value may be used as a substitute for a PUF key of a device.

The data generation part 10, the data preservation part 20, and data concealment part 30 are respectively composed of circuit elements inside a digital chip, are connected to each other by signal lines, and are operated by applying a specific signal or by an event signal.

Figure 3:
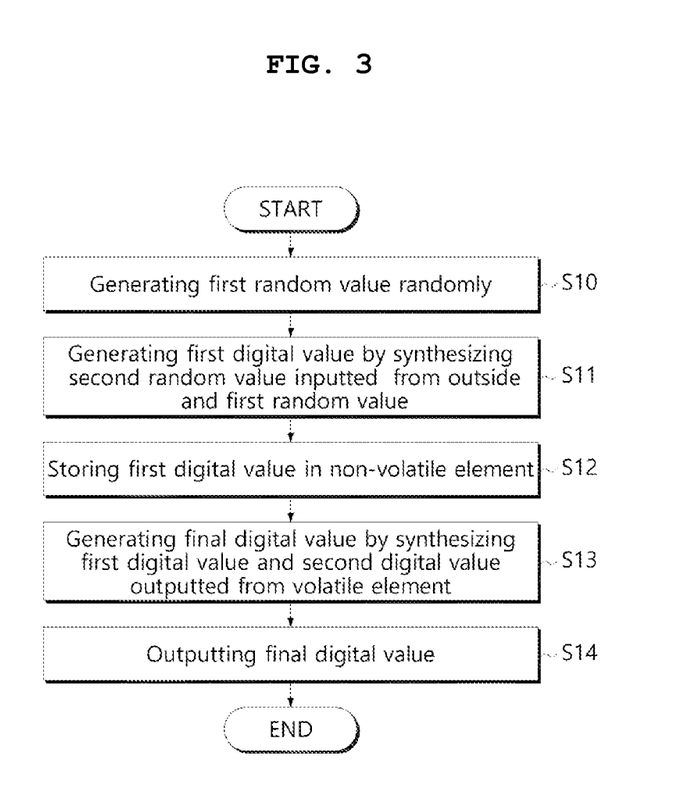
FIG. 3 is a flowchart illustrating a method of generating a digital value according to the first exemplary embodiment of the present disclosure.

FIG. 3 is a flowchart illustrating a method of generating a digital value according to the first exemplary embodiment of the present disclosure. Referring to FIG. 3, in step S10, a data generation part 10 randomly generates a first random value internally according to an applied signal. In addition, in step S11, the data generation part 10 receives a second random value randomly generated and input from outside, synthesizes the first random value generated internally and the second random value, and outputs a first digital value. The randomness of the first digital value generated by the data generation part 10 may be confirmed.

In step S12, a data preservation part 20 stores the first digital value outputted from the data generation part 10 in an internal non-volatile element 21. Since the first digital value is stored in the non-volatile element 21, the first digital value stored therein may be maintained even when an external stimulus such as temperature or voltage is applied or time passes, thereby ensuring data preservation. The data preservation part 20 outputs the first digital value stored in the non-volatile element 21 to a data concealment part 30 in response to a specific event.

The data concealment part 30 receives the first digital value from the data preservation part 20, synthesizes the first digital value and a second digital value outputted from the internal volatile element 31, and generates the final digital value in step S13, and outputs the final digital value in step S14. Since the data concealment part 30 synthesizes the output value of the volatile element 31, the final digital value is not exposed to the outside.

The operations of the above-described data generation part 10 and data preservation part 20 are mainly performed in a factory where a semiconductor chip is produced and the operation of the data concealment part 30 is generally performed at a stage of actual use of the semiconductor chip, but the present disclosure is not limited thereto.

An apparatus for generating a digital value, and a method therefor according to a second exemplary embodiment of the present disclosure will be described with reference to FIGS. 4 to 5. A description overlapping with the above-described exemplary embodiment will be omitted when necessary.

Figure 4:
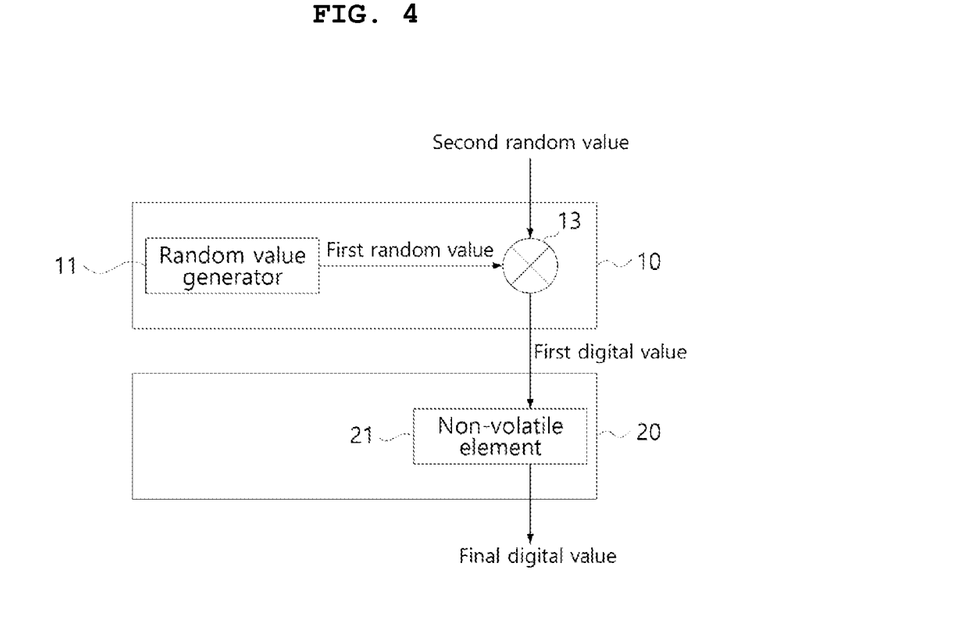
FIG. 4 is a schematic diagram illustrating an apparatus for generating a digital value according to a second exemplary embodiment of the present disclosure.

FIG. 4 is a schematic diagram illustrating the apparatus for generating the digital value according to the second exemplary embodiment of the present disclosure. Referring to FIG. 4, the apparatus for generating the digital value according to the present exemplary embodiment includes a data generation part 10 and a data preservation part 20.

The data generation part 10 is configured to generate a random first digital value in response to an applied signal, and is a means for ensuring randomness of data. Referring to FIG. 4, the data generation part 10 includes a random value generator 11 and a synthesizer 13.

The random value generator 11 is configured to randomly generate a first random value in response to an applied signal, and may include any one of a PUF, a HRNG, a TRNG, and a software random number generator. Since the output of the internal random value generator 11 is not exposed to outside and is random, the output is not leaked to the outside, whereby security is enabled.

The synthesizer 13 outputs a first digital value by synthesizing a second random value randomly generated and input from the outside and a first random value generated by an internal random value generator 11. The synthesizer 13 may include an operator that performs an operation such as an exclusive-or (XOR) operation. The second random value is a value generated externally and input to the data generation part 10, and may be generated by external equipment or an external device.

As such, in the present disclosure, while taking the randomness of external equipment, the digital value may be prevented from leaking to the outside by making the digital value unknown to the external equipment.

The data preservation part 20 is configured to store the first digital value outputted from the data generation part 10, and is a means for ensuring data preservation. The data preservation part 20 includes a non-volatile element 21 for storing the first digital value.

The non-volatile element 21 may be implemented by at least one of a ROM, a PROM, an EPROM, an EEPROM, and a flash memory. The data preservation part 20 may store the first digital value only once, or may store the first digital value several times according to the characteristics of the non-volatile element 21. The number of times that data is stored may be set differently according to the characteristics and designs of the non-volatile element 21.

Since the non-volatile element 21 maintains the first digital value stored therein even when an external stimulus such as temperature or voltage is applied or time passes, data preservation may be ensured.

The data preservation part 20 outputs the first digital value stored in the non-volatile element 21 as the final digital value in response to a specific event.

Figure 5:
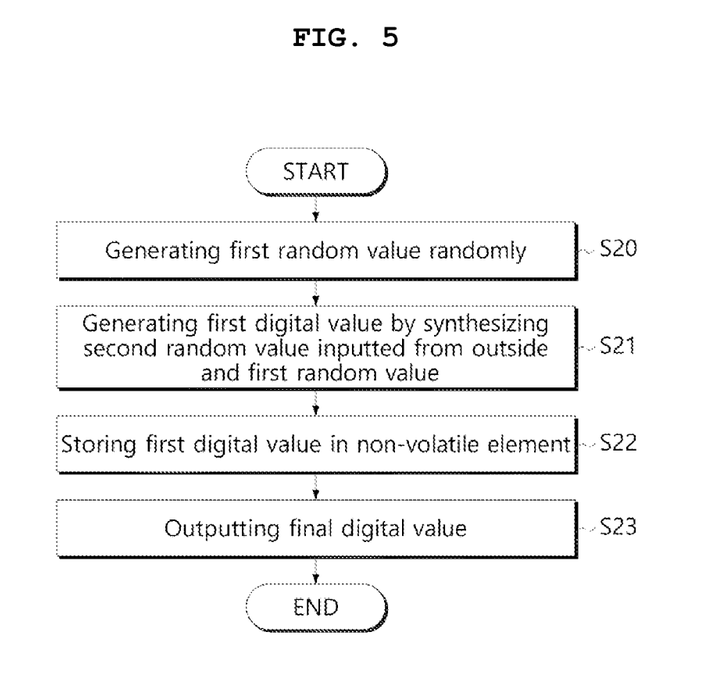
FIG. 5 is a flowchart illustrating a method of generating a digital value according to the second exemplary embodiment of the present disclosure.

FIG. 5 is a flowchart illustrating a method of generating a digital value according to the second exemplary embodiment of the present disclosure. Referring to FIG. 5, in step S20, a data generation part 10 generates a first random value randomly generated internally according to an applied signal. In addition, in step S21, the data generation part 10 receives a second random value randomly generated from outside, synthesizes the first random value generated internally and the second random value, and outputs a first digital value. The randomness of the first digital value generated by the data generation part 10 may be confirmed.

In step S22, the data preservation part 20 stores the first digital value outputted from the data generation part 10 in the internal non-volatile element 21. In addition, in step S23, the first digital value stored by the external event is output as the final digital value. Since the data preservation part 20 stores the first digital value in the non-volatile element 21, the first digital value stored therein may be maintained even when an external stimulus such as temperature, voltage, or the like is applied or time passes, whereby data preservation may be ensured.

An apparatus for generating a digital value, and a method therefor according to a third exemplary embodiment of the present disclosure will be described with reference to FIGS. 6 to 7. A description overlapping with the above-described exemplary embodiment will be omitted when necessary.

Figure 6:
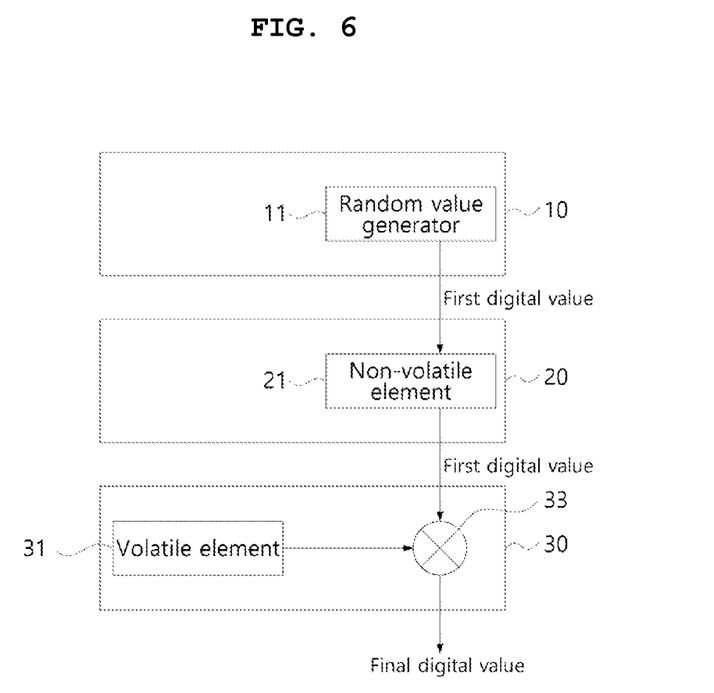
FIG. 6 is a schematic diagram illustrating an apparatus for generating a digital value according to a third exemplary embodiment of the present disclosure.

FIG. 6 is a schematic diagram illustrating the apparatus for generating the digital value according to the third exemplary embodiment of the present disclosure. Referring to FIG. 6, the apparatus for generating the digital value according to the present exemplary embodiment includes a data generation part 10, a data preservation part 20, and a data concealment part 30.

The data generation part 10 is configured to generate a random first digital value in response to an applied signal, and is a means for ensuring randomness of data. Referring to FIG. 4, the data generation part 10 includes a random value generator 11.

The random value generator 11 is configured to randomly generate the first digital value randomly generated in response to the applied signal, and may include any one of a PUF, a HRNG, a TRNG, and a software random number generator. Since the output of the internal random value generator 11 is not exposed to outside and is random, the output is not leaked to the outside, whereby security is enabled.

The data preservation part 20 is configured to store the first digital value outputted from the data generation part 10, and is a means for ensuring data preservation. The data preservation part 20 includes a non-volatile element 21 for storing the first digital value.

The non-volatile element 21 may be implemented by at least any one of a ROM, a PROM, an EPROM, an EEPROM, and a flash memory. Since the non-volatile element 21 maintains the first digital value stored therein even when an external stimulus such as temperature or voltage is applied or time passes, data preservation may be ensured.

The data preservation part 20 outputs the first digital value stored in the non-volatile element 21 to the data concealment part 30 in response to a specific event signal.

The data concealment part 30 receives the first digital value outputted from the data preservation part 20, synthesizes the first digital value and a second digital value outputted from an internal volatile element 31, and outputs a final digital value. The data concealment part 30 includes the volatile element 31, and the second digital value outputted from the volatile element 31 may be input from the outside, or may be generated internally. The volatile element 31 uses an element that always maintains a predetermined value when the digital values are synthesized.

The data concealment part 30 includes a synthesizer 33 for synthesizing the first digital value and the second digital value. The synthesizer 33 may include an operator that performs an operation such as an exclusive-or (XOR) operation. In the synthesizer 33, a synthesizer 33 that does not degrade the random characteristics of the second digital value outputted from the volatile element is used.

Since the data concealment part 30 synthesizes data through the volatile element 31, only the first digital value of the data preservation part 20 using the non-volatile element 21 is exposed even by chip decapsulation (De-Cap), whereby the final digital value is not exposed.

Figure 7:
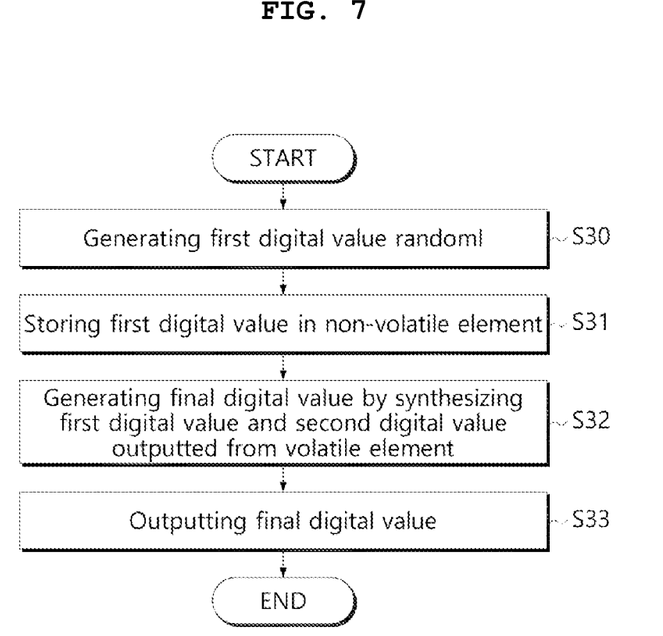
FIG. 7 is a flowchart of a method of generating a digital value according to the third exemplary embodiment of the present disclosure.

FIG. 7 is a flowchart of a method of generating a digital value according to the third exemplary embodiment of the present disclosure. Referring to FIG. 7, in step S30, a data generation part 10 generates a first digital value randomly generated internally according to an applied signal. The randomness of the first digital value generated by the data generation part 10 may be confirmed.

In step S31, a data preservation part 20 stores the first digital value outputted from the data generation part 10 in an internal non-volatile element 21. Since the data preservation part 20 stores the first digital value in the non-volatile element 21, the first digital value stored therein may be maintained even when an external stimulus such as temperature, voltage, or the like is applied or time passes, whereby data preservation may be ensured. The data preservation part 20 outputs the first digital value stored in the internal non-volatile element 21 to a data concealment part 30 by applying a specific signal.

The data concealment part 30 receives the first digital value stored in the non-volatile element 21, synthesizes the first digital value and a second digital value outputted from the internal volatile element 31, and generates a final digital value in step S32, and outputs the final digital value in step S33. Since the data concealment part 30 synthesizes the output value of the volatile element 31, the final digital value is not exposed to the outside.

As described above, in the final digital value generated by the apparatus for generating the digital value, and the method therefor according to the present disclosure, the randomness of the final digital value is confirmable and the final digital value is non-copyable, thereby having an effect of not being leaked to the outside.

In the above, the preferred exemplary embodiments of the present disclosure have been illustrated and described, but the present disclosure is not limited to the specific exemplary embodiments described above. In the present disclosure, various modifications may be possible by those skilled in the art to which the present disclosure belongs without departing from the spirit of the present disclosure claimed in the claims, and these modifications should not be understood individually from the technical ideas or prospect of the present disclosure.

The invention claimed is:

1. An apparatus for generating a non-copyable digital value, the apparatus comprising:
    a data generation part configured to randomly generate a first digital value;
    a non-volatile memory configured to store the first digital value; and
    a data concealment part configured to generate a final digital value by synthesizing the first digital value and a second digital value outputted from a volatile memory,
    wherein the data generation part comprises:
    a random value generator configured to randomly generate a first random value; and
    a synthesizer configured to generate the first digital value by synthesizing the first random value and a second random value randomly generated and input from outside.

2. The apparatus of claim 1, wherein the random value generator comprises at least one of a physical unclonable function (PUF) and a true random generator.

3. The apparatus of claim 1, wherein the second digital value outputted from the volatile element is input from the outside, or is generated internally.

4. The apparatus of claim 1, wherein the data concealment part comprises:
    a synthesizer configured to generate the final digital value by synthesizing the first digital value and the second digital value.

5. The apparatus of claim 4, wherein the synthesizer comprises:
    an XOR logic circuit.

6. The apparatus of claim 4, wherein the final digital value comprises:
    an identification key; or
    a unique ID.

7. The apparatus of claim 1, wherein the synthesizer comprises:
    an XOR logic circuit.

8. A method for generating a non-copyable digital value, the method comprising:
    generating a first random value randomly; and
    generating the first digital value by synthesizing the first random value and a second random value that is random and input from outside;
    storing the first digital value to a non-volatile memory; and
    generating a final digital value by synthesizing the first digital value and a second digital value outputted from a volatile memory.

9. The method of claim 8, wherein the second digital value outputted from the volatile element is input from the outside, or is generated internally.

* * * * *